United States Patent
Price

(10) Patent No.: US 9,284,118 B2
(45) Date of Patent: Mar. 15, 2016

(54) REFUSE VEHICLE SHIELD AND BIN COVER

(71) Applicant: The Heil Co., Chattanooga, TN (US)

(72) Inventor: Thomas L. Price, Mentone, AL (US)

(73) Assignee: The Heil Co., Chattanooga, TN (US)

( * ) Notice: Subject to any disclaimer, the term of this patent is extended or adjusted under 35 U.S.C. 154(b) by 245 days.

(21) Appl. No.: 13/827,908

(22) Filed: Mar. 14, 2013

(65) Prior Publication Data

US 2013/0336751 A1    Dec. 19, 2013

Related U.S. Application Data

(60) Provisional application No. 61/661,498, filed on Jun. 19, 2012.

(51) Int. Cl.
  B65F 3/00 (2006.01)
  B65F 3/12 (2006.01)
  B60J 7/04 (2006.01)
  B65F 3/02 (2006.01)

(52) U.S. Cl.
  CPC . B65F 3/12 (2013.01); B60J 7/041 (2013.01); B65F 3/00 (2013.01); *B65F 2003/0279* (2013.01)

(58) Field of Classification Search
  CPC .............. B60J 7/04; B60J 7/041; B60J 7/14; B60J 7/141; B60J 7/16; B60J 7/1607; B65F 3/12; B65F 2003/0286; B65F 2003/0289; B65F 1/122; B65F 3/00; B65F 3/048; B65F 3/143; B65F 3/201; B65F 3/28; B65F 2003/0263; B65F 2003/0279; B66F 9/07545
  See application file for complete search history.

(56) References Cited

U.S. PATENT DOCUMENTS

| | | | | | |
|---|---|---|---|---|---|
| 1,395,129 | A | * | 10/1921 | McCorkindale | 296/100.04 |
| 1,710,874 | A | * | 4/1929 | Hoch | 296/98 |
| 2,014,140 | A | * | 9/1935 | Larsen | 296/100.04 |
| 2,140,960 | A | * | 12/1938 | Kercher | 296/100.03 |
| 2,652,163 | A | * | 9/1953 | Stickney | 414/501 |
| 2,882,093 | A | * | 4/1959 | Schaffer | 296/100.04 |
| 2,900,096 | A | * | 8/1959 | Dempster | B60P 1/50 414/408 |
| 3,833,255 | A | * | 9/1974 | Logue | 296/101 |
| 3,901,394 | A | | 8/1975 | Bowles | |
| 3,910,629 | A | * | 10/1975 | Woodard | 296/101 |
| 4,029,356 | A | | 6/1977 | Hoch | |
| 4,201,508 | A | | 5/1980 | Brisson | |
| 4,277,098 | A | * | 7/1981 | Gibney | 296/100.09 |
| 4,538,951 | A | | 9/1985 | Yeazel et al. | |

(Continued)

FOREIGN PATENT DOCUMENTS

| | | | | |
|---|---|---|---|---|
| DE | 19831130 A1 | * | 1/2000 | B60J 7/02 |
| DE | 19914409 A1 | * | 10/2000 | B65F 3/12 |

(Continued)

*Primary Examiner* — Glenn Dayoan
*Assistant Examiner* — Paul Chenevert
(74) *Attorney, Agent, or Firm* — Harness, Dickey & Pierce, P.L.C.

(57) ABSTRACT

A front loading refuse collection vehicle (10) has a cab (12) connected with a storage bin (14). The storage bin (14) includes an opening (18) that enables refuse to enter into the storage bin (14). The refuse is supplied by a front loading device (16) into the bin. Covers (20, 120) overlay the opening (18) when the vehicle (10) is in motion from collection position to collection position. Additionally, the cover (20, 120) moves from a bin covering position into a cab shielding position.

15 Claims, 4 Drawing Sheets

(56) References Cited

U.S. PATENT DOCUMENTS

| | | | |
|---|---|---|---|
| 4,691,959 A | 9/1987 | Verner | |
| 4,698,150 A | 10/1987 | Wigoda | |
| 4,715,767 A | 12/1987 | Edelhoff et al. | |
| 4,909,564 A | 3/1990 | Pfeifer et al. | |
| 5,031,949 A * | 7/1991 | Sorimachi et al. | 296/76 |
| 5,169,223 A | 12/1992 | Suzuki et al. | |
| 5,607,277 A | 3/1997 | Zopf | |
| 5,797,715 A | 8/1998 | Christenson | |
| 5,816,766 A | 10/1998 | Clark | |
| 6,033,176 A | 3/2000 | Bartlett | |
| 6,123,497 A | 9/2000 | Duell et al. | |
| 6,158,945 A | 12/2000 | Anderson et al. | |
| 6,213,706 B1 | 4/2001 | Christenson | |
| 6,505,878 B1 * | 1/2003 | Mascolo | 296/100.04 |
| 7,063,495 B1 | 6/2006 | Johnson | |
| 2008/0174142 A1 * | 7/2008 | Pearlman | 296/100.1 |
| 2012/0280481 A1 * | 11/2012 | Gentry | 280/834 |

FOREIGN PATENT DOCUMENTS

| | | | | |
|---|---|---|---|---|
| EP | 0700802 A1 * | 3/1996 | | B60J 7/14 |
| EP | 0 728 682 | 8/1996 | | |
| EP | 1 067 064 | 1/2001 | | |
| FR | 1146358 A * | 11/1957 | | B60J 7/04 |
| GB | 444152 A * | 3/1936 | | B60J 7/04 |

* cited by examiner

REFUSE VEHICLE SHIELD AND BIN COVER

CROSS-REFERENCE TO RELATED APPLICATION

This application claims the benefit of U.S. Provisional Application No. 61/661,498, filed on Jun. 19, 2012. The entire disclosure of the above application is incorporated herein by reference.

FIELD

The present disclosure relates to front loading refuse collection vehicles and, more particularly, to a vehicle that includes a cover that closes off the storage bin opening as well as provides a cab shield.

BACKGROUND

In front loading refuse collection vehicles, load containers varying from 1 to 10 cubic yards are lifted over the front of the cab and emptied into the front of the storage bin of the body of the vehicle. Refuse is then compacted from the front of the storage bin towards the rear. The storage bin requires a cover to close off its opening so that during movement between collection locations, the storage bin is covered and refuse does not exit the storage bin through the opening.

In front loading refuse collection vehicles, the waste containers are lifted and travel over the cab of the vehicle. Thus, it is desirous to shield the cab from falling debris that may occur during the lifting of the containers over the vehicle cab.

The present disclosure provides a movable cover that covers the storage bin opening in one position and also shields the cab in a second position. The cover is positioned over the storage bin opening when the vehicle is moving from collection area to collection area. The cover is moved to a cab shield position when the containers are lifted from the ground by the front loader and pass over the cab and are emptied into the storage bin. The cover eliminates weight from the front axle of the chassis. The cover moves the cab shield to the top of the body to provide an aesthetic appearance to the vehicle. Additionally, the dual purpose cover reduces the overall cost of the vehicle.

SUMMARY

According to a first aspect of the disclosure, a front loading refuse collection vehicle comprises a cab connected with a storage bin. The storage bin includes an opening that enables refuse to enter into the storage bin. The refuse is supplied by a front loading device on the vehicle into the bin. A cover overlays and seals the opening when the vehicle is in motion moving from one collection point to another collection point. During refuse pick-up, the cover moves from a bin covering position into a cab shielding position. The cover may be pivoted between its bin covering position and its cab shielding position. The cover may rotate through about 210°. Alternatively, the cover can slide between its bin covering positions and its cab shield positions. The cover may be manufactured from resin reinforced material or a composite reinforced material. The cover may include a plurality of panels.

According to a second aspect of the disclosure, a cover for a front loading refuse collection vehicle with an opening on a roof of a storage bin comprises a member adapted for movably coupling with the storage bin roof. The member covers the opening in the roof. A mechanism moves the member between a first position, covering the opening, and a second position, providing a cab shield. The cover may be pivoted between its first and second positions. The cover can rotate through about 210°. Alternatively, the cover can slide between its first and second positions. The cover is manufactured from a resin reinforced material or a composite reinforced material. The cover may include a plurality of panels.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
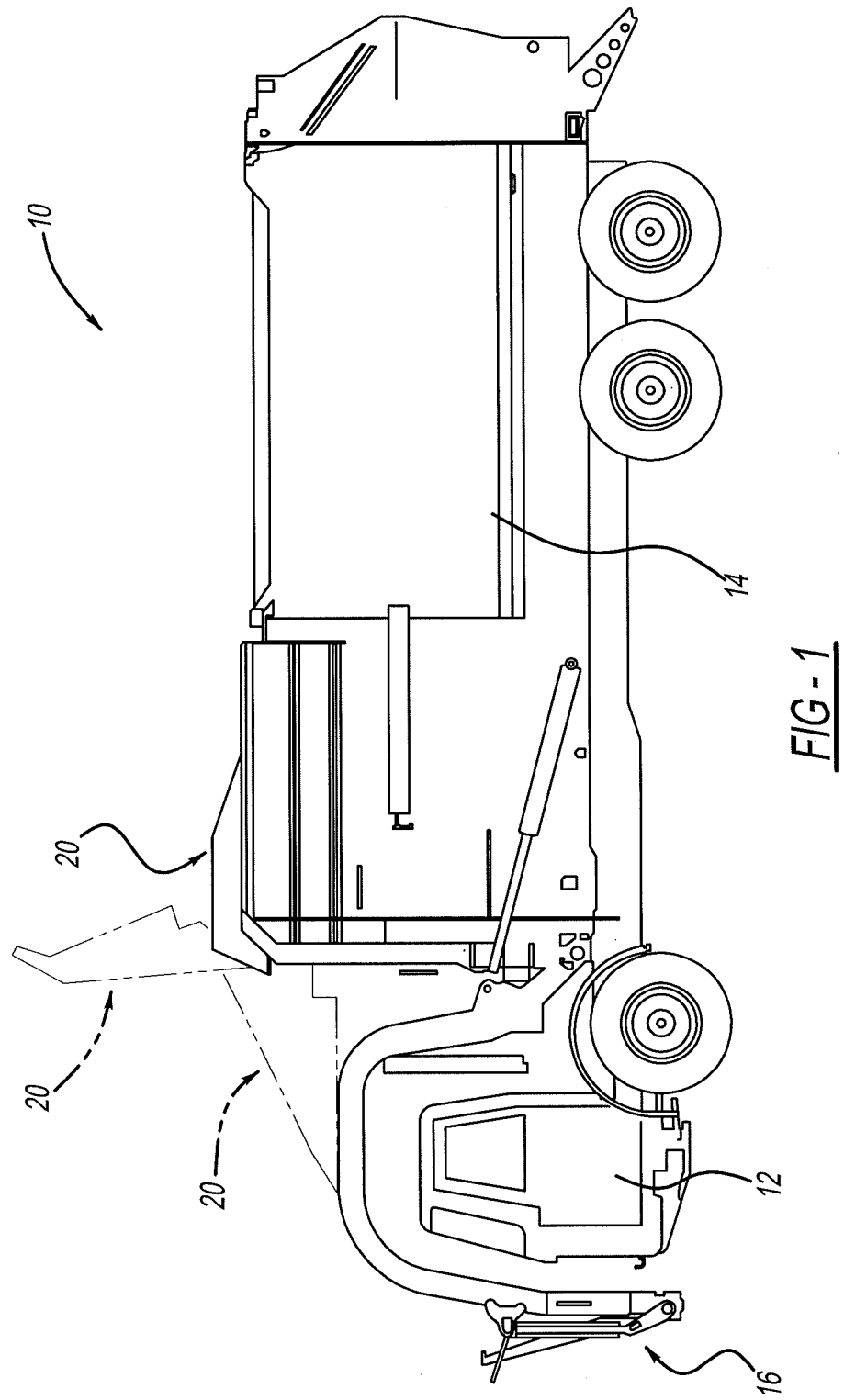
FIG. 1 is a side elevation view of a refuse collection vehicle with a cover positioned over an opening in the top of the storage bin.

Example embodiments will now be described more fully with reference to the accompanying drawings.

Turning to the figures, a front loading refuse collection vehicle is illustrated and designated with the reference numeral 10. The vehicle 10 includes a cab 12 and storage bin 14 secured to the vehicle chassis or frame. A front loading device 16 is coupled with the storage bin 14 via a hydraulic cylinder linkage. The front loading device 16 moves from a resting position in front of the cab 12, where containers are collected by the front loading device 16, to a retracted position, where the containers are dumped into the storage bin 14. The storage bin 14 includes an opening 18 on its top to enable the containers to be dumped into the storage bin 14. A cover 20 is coupled with the storage bin 14 and positioned over the opening 18.

Figure 2:
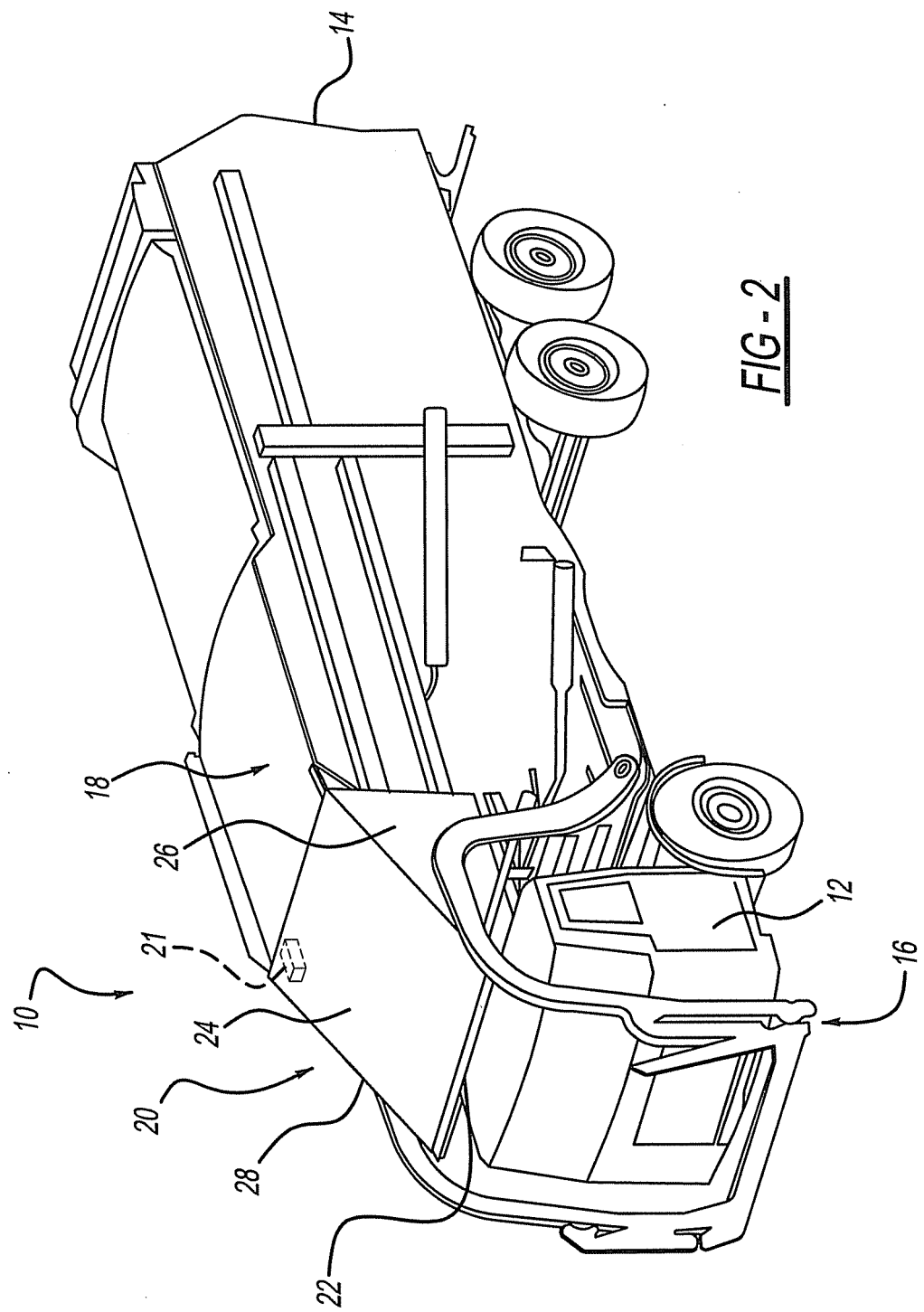
FIG. 2 is a perspective view of the refuse collection vehicle of FIG. 1 with the cover in a cab shield position.

The cover 20 is pivotally secured to the storage bin 14. The cover 20 pivots from a position overlaying and sealing the opening 18, as illustrated in FIG. 1, to a cab shield position shielding the cab from falling debris as illustrated in FIG. 2. The cover 20 generally rotates through about 210° of rotation from one position to the other. The cover 20 may be rotated by an actuator 21, such as a rotary actuator, a link actuator or rotated by a gearing arrangement. The actuators may be hydraulically, pneumatically or electrically activated or driven. Thus, other types of actuators may be utilized to rotate the cover 20 from position to position.

The cover 20 has an overall rectangular shape. Generally, it includes a downturned nose 22 and a plate section 24. A pair of plates 26 and 28 is included to add rigidity to the cover 20. The cover 20 may be manufactured from any material that provides the requisite strength and durability required for the cover. Thus, the cover 20 may be made from a metallic material, a cast material, a composite material including reinforcing fibers, such as glass, a resin material including fibers, such as glass, that provides the desired strength and rigidity. By providing a cover that is manufactured from a resin fiber material, the cover is lighter than those that would be constructed from a metallic material.

Figure 3:
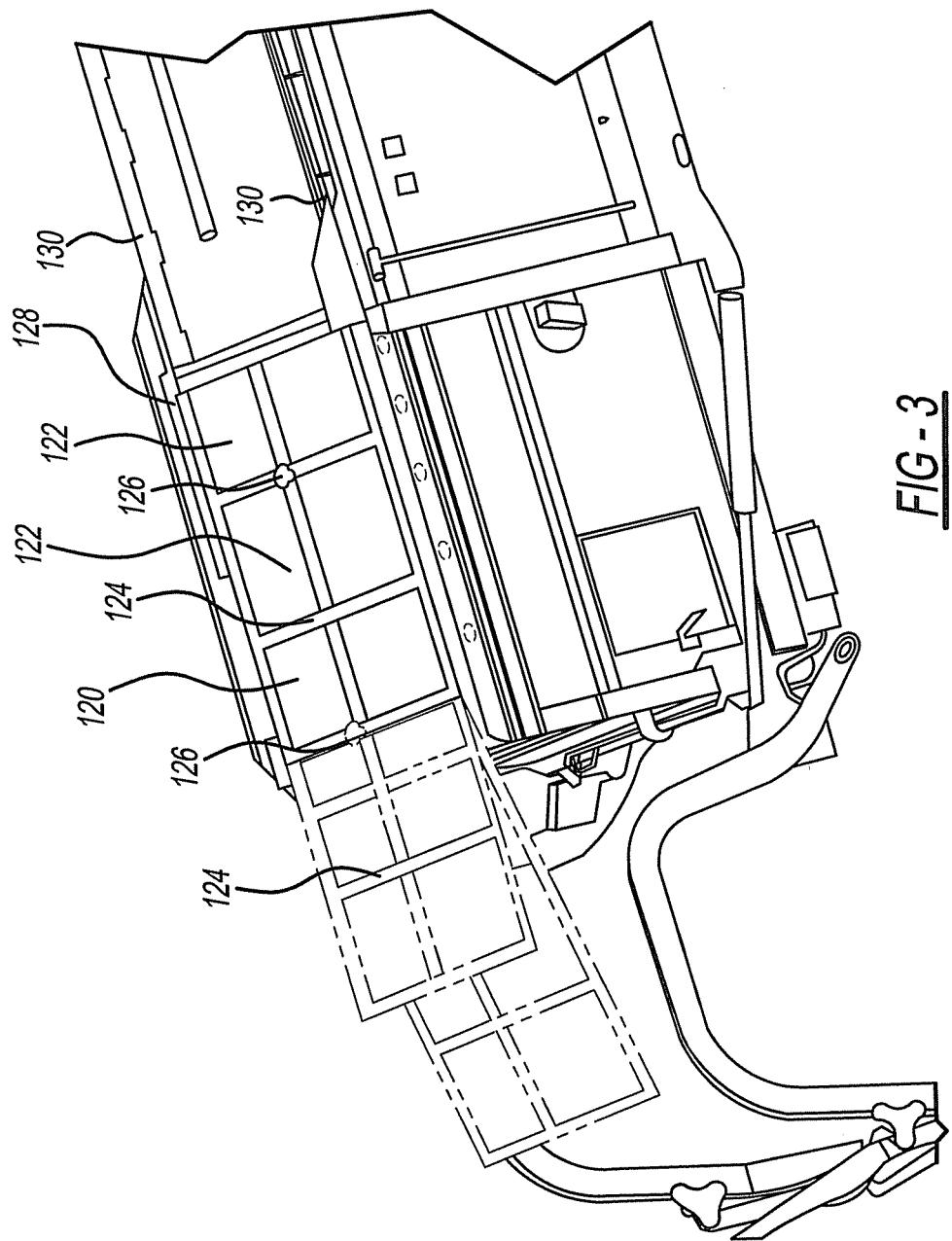
FIG. 3 is a perspective view of a second embodiment of a cover positioned over the opening in the top of the storage bin.
Figure 4:
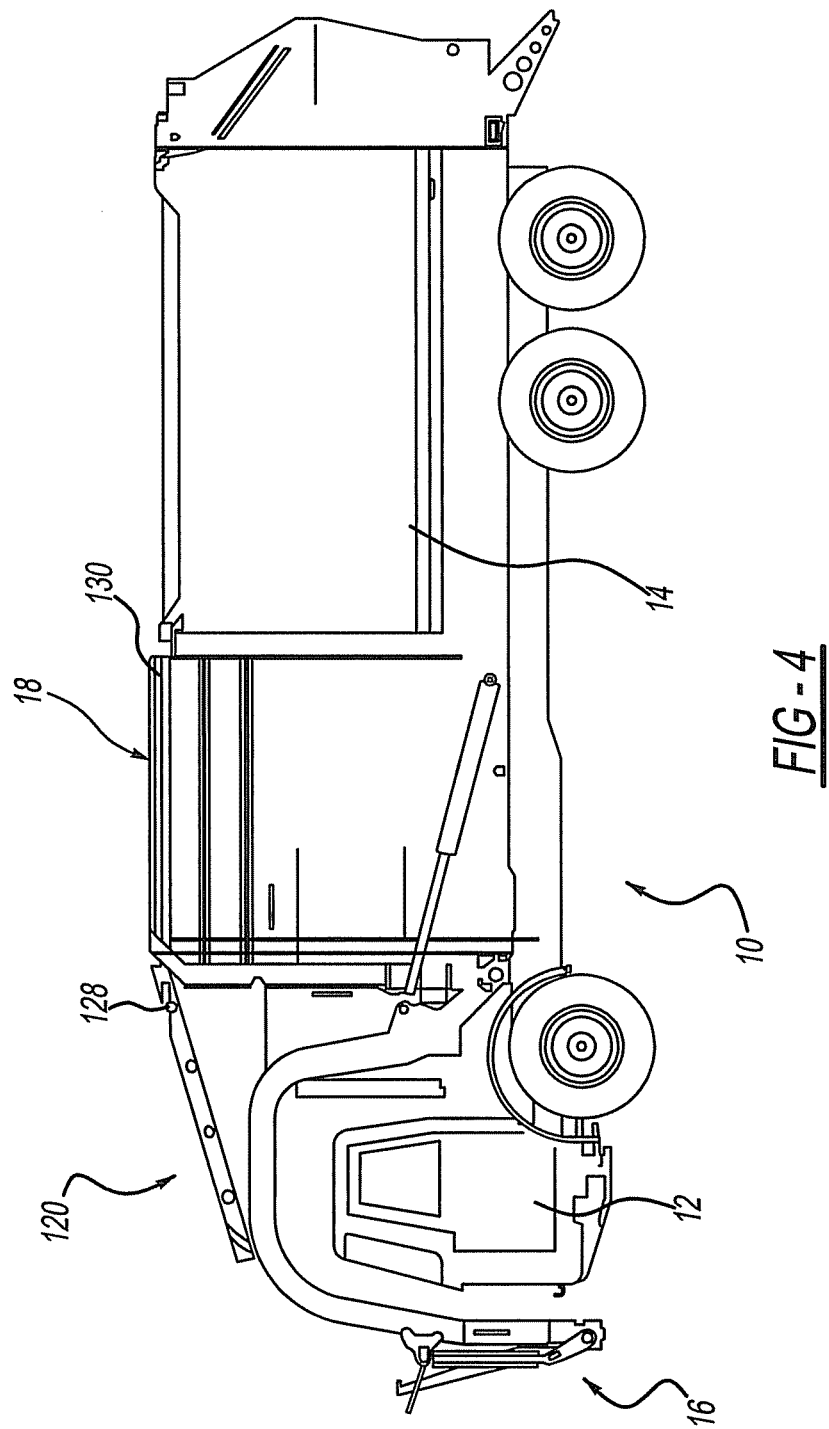
FIG. 4 is a side elevation view of the cover of FIG. 3 in a cab shield position.

Turning to FIGS. 3 and 4, an additional embodiment is illustrated. Here the elements that are the same as those previously discussed are designated with the same reference numerals. The differences are in the cover 120.

The vehicle 10 includes a cab 12 and a storage bin 14. The front loader mechanism 16 is illustrated coupled to the storage bin 14 via hydraulic or pneumatic cylinders. The storage bin 14 includes an opening 18 that is sealed by a cover 120.

The cover 120 has an overall rectangular configuration. The cover 120 is formed from a plurality of panels 122. The panels 122 are connected via a framework 124. The framework 124 provides rigidity to the cover 120. The cover 120 includes hinges 126 that enable the panels 122 to pivot with respect to one another. Thus, as the cover 120 is moved forward (as shown in FIG. 3) towards the cab, the panel 122 pivots downward to act as a cab shield as illustrated in FIG. 4.

A rail 130 is secured to the bin 14. A roller 128 system, like those used in a garage door mechanism, is secured to the framework 124 of the cover 120. Thus, the framework 124 includes rollers 128 secured on its sides which, in turn, are positioned in rails 130 that secured to the storage bin 14. The cover 120 may be moved by a chain mechanism, gear mechanism, rack and pinion mechanism or the like positioned onto the framework 124 and rails 130. Thus, the driver may control the movement of the cover 124 moving it to the front to shield the cab, moving it to the back to uncover the opening 18 and moving it to a neutral position to cover the opening as illustrated in FIG. 3.

The cover 120 may have a plurality of cab shielding positions. In a first position, the cab shield extends parallel and continuous with the rails 130. As the cover is moved further forward, the hinge 126 activates enabling the cover 120 to pivot so that a portion of the cover 120 is angled with respect to the rails 130 as see in FIG. 4. Additionally, the cover may be larger than the opening so that it can be retracted further along the storage bin 14 covering more area than just the opening itself.

A controller would be positioned in the cab to enable the driver to manipulate the cover from a cover position to a shield position. This may be accomplished by various types of controls moving the cover from position to position.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:

1. A front loading refuse collection vehicle comprising:
a cab connected with a storage bin;
the storage bin includes a top with an opening, the opening enables refuse to pass through the top and enter into the storage bin;
the refuse is supplied by a front loading device into the storage bin;
a cover, the cover is positioned on the top to overlay the opening when the vehicle is in motion moving from collection position to collection position; and
wherein the cover is capable of moving from a bin covering position into a cab shielding position, the cover pivots at the top of the storage bin so that the cover is angled downward toward the cab and the cover is in the cab shield position when refuse is loaded into the storage bin.

2. The front loading refuse collection vehicle according to claim 1, wherein the cover is manufactured from a resin reinforced material.

3. The front loading refuse collection vehicle according to claim 1, wherein the cover is manufactured from a composite reinforced material.

4. The front loading refuse collection vehicle according to claim 1, wherein the cover pivots between the bin covering position to the cab shielding position.

5. The front loading refuse collection vehicle according to claim 4, wherein the cover rotates through about 210° from the bin covering position to the cab shielding position.

6. The front loading refuse collection vehicle according to claim 1, wherein the cover slides between the bin covering position and the cab shielding position.

7. The front loading refuse collection vehicle according to claim 6, wherein the cover includes a plurality of panels.

8. A cover device for a front loading refuse collection vehicle with an opening on a top of a storage bin comprising:
a member positioned on the top of the storage bin, the member adapted for movement with respect to the top of the storage bin, the member capable of covering the opening on the top of the storage bin; and
a mechanism for moving the member between a first position, wherein the member is capable of covering the opening on the top of the storage bin, to a second position, the cover pivots at the top of the storage bin so that the cover is angled downward toward the cab wherein the member is capable of providing a cab shield when refuse is dumped into the storage bin.

9. The cover device according to claim 8, wherein the member slides between the first position and the second position.

10. The cover device according to claim 8, wherein the member is manufactured from a resin reinforced material.

11. The cover device cover according to claim 8, wherein the member is manufactured from a composite reinforced material.

12. The cover device according to claim 8, wherein the mechanism moves the member between the first and second positions.

13. The cover device according to claim 8, wherein the member pivots between the first position to the second position.

14. The cover device according to claim 13, wherein the member includes a plurality of panels.

15. The cover device according to claim 13, wherein the member rotates through about 210° from the first position to the second position.

* * * * *